Nov. 27, 1928.
J. S. BLAIKIE
1,692,810
GUIDE FOR MEAT SLICERS
Filed Sept. 27, 1927
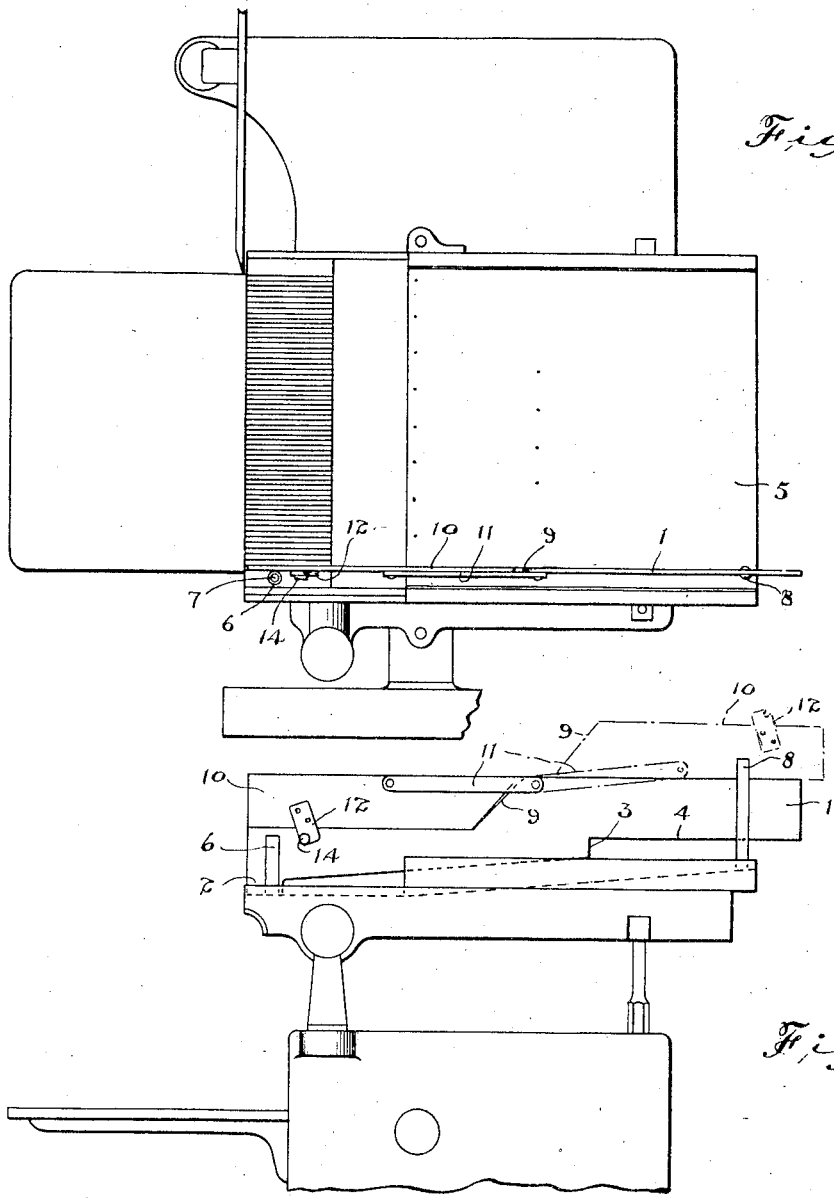
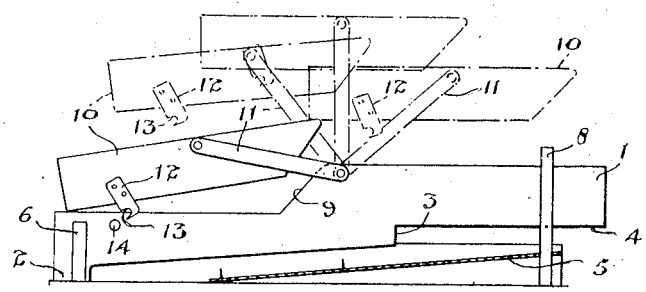
Inventor.
John S. Blaikie Patented Nov. 27, 1928.

1,692,810

UNITED STATES PATENT OFFICE.

JOHN STANLEY BLAIKIE, OF TORONTO, ONTARIO, CANADA.

GUIDE FOR MEAT SLICERS.

Application filed September 27, 1927. Serial No. 222,362.

The principal objects of the invention are to ensure the neater slicing of meats by providing a guide which will hold the meat firmly from dragging or sagging away from the knife, which ensures a clean cut right through the meat and not only produces a clean, uniform slice but obviates waste.

A further object is to provide a guide which is readily adjustable to suit different kinds of meat to be sliced and is also readily removable to enable the slicer being properly cleaned.

The principal feature of the invention consists in the novel construction and arrangement of a guide member upon the cutter table of a meat slicer whereby a rigid wall is provided against which the meat is pressed in being cut, said wall being removable and having an adjustable removable portion which will allow the full latitude of movement of the meat holder.

In the accompanying drawings, Figure 1 is a plan view showing the table of a meat slicer with my attachment arranged thereon.

Figure 2 is a side elevational view of the attachment, showing the adjustable portion thereof in a turned back position in dotted lines.

Figure 3 is a side elevational view of the attachment showing the adjustable portion thereof in various positions in dotted lines being moved out of the way back from the forward end.

In many forms of meat slicers in common use the meat is clamped upon a table which is fed forward according to the thickness of slice required and the rigidity with which the meat is held depends entirely upon the clamping device for holding the meat down to the table. Many kinds of meat are not sufficiently firm to hold up against the pressure of the knife at the outward side, and it has been proposed to support the meat at the side farthest from the knife by arranging a rigid wall or fence at the outer side of the table.

This invention comprises a thin metal plate 1 which is provided with a foot 2 at the forward end in the form of a down-turned lug, which rests upon the forward plate of the slicing machine.

The bottom edge of the plate 1 slopes upwardly and backwardly from the foot 2 and is preferably formed with a notch 3 and a horizontal edge 4 at the rear end which extends above the plate 5 of the slicing machine.

A tubular guide 6 is brazed or otherwise secured to the outer side face of the front end of the plate 1 and fits over a pin 7 secured in the table of the slicer machine.

The rear end of the plate 1 is supported in a vertically slotted post 8 which holds the plate securely in place at the outward side of the cutter table.

The top edge of the plate 1 is formed intermediate of its length with a downward offset 9 which slopes forwardly and a plate 10 of the same thickness as the plate 1 is shaped to fit into the offset and to extend to the top edge of the rearward part of the plate 1.

A link 11 is pivotally secured to the outside of the plate 1 back of the offset 9 and is adapted to swing forwardly and overlap the offset. The forward end of this link is pivotally secured intermediate of the length of the plate 10.

A bracket lug 12 is secured to the outer side of the plate 10 and extends below the bottom edge thereof and is formed with a notch 13 in the forward edge. This notch is adapted to engage the shank of a headed pin 14 secured in the outer side of the plate 1, thus rigidly holding the plate 10 in alignment with the plate 1 in its forward position, the beveled rear end of said plate 10 engaging the offset 9.

When the plate 10 is in the forward position as shown in Figure 2, it, together with the forward end of the plate 1, presents a rigid side wall to support the piece of meat that is placed on the table so that the knife will cut through the meat without it sagging and being torn or chattered.

When the piece of meat to be cut is of a thickness that is considerably less than the height of the double plate and the plate 10 is in the way of the holder for holding the meat down to the table, the plate 10 is lifted at its rearward end, as illustrated in full lines in Figure 3. This movement disengages the notched lug 12 from the pin 14 and the plate may then be swung rearwardly, as illustrated by the dotted lines in Figure 3, until it rests upon the top edge of the rear part of the plate out of the way of the holders.

The operation of the device is very simple, there is nothing to get out of order and it is strong and durable.

The tube support 6 may be lifted off the pin 7 and the rear end of the plate lifted out of the slotted post 8 with a simple movement of the hand so that the machine may be cleaned to the edge without interference and without the operator having to dig into the corners to remove dirt or waste particles of meat.

The device is quite readily applied to any standard machine and is quite inexpensive but performs a very desirable service.

What I claim as my invention is:

1. A guide for meat slicers, comprising a thin metal plate adapted to be supported in a vertical position at the outward side of the slicer table and having the forward end formed with a removable section.

2. A guide for meat slicers, comprising a thin metal plate having a vertical support at the forward end adapted to hold it rigidly at one side of the slicer table, means for supporting the rear end of the plate, a supplementary plate section adapted to rest on the upper edge of said plate at the forward end, and means for holding said supplementary plate in adjusted position.

3. A guide for meat slicers, comprising a thin metal plate having an offset upper edge with the forward portion lower than the rear portion, a second plate adapted to fit into the offset forward portion and to rest upon the edge thereof, a lug arranged on the outer side of the latter plate extending below the bottom edge thereof, means on the outer side of the lower plate adapted to engage said lug to hold it locked, and a pivotal link secured to the movable plate section intermediate its length and having its other end pivotally secured to the rigid plate.

4. A guide for meat slicers, comprising a thin metal plate having a foot at its forward end and an upwardly and rearwardly sloping bottom edge, a tubular guide secured to the outer side of said plate at the foot end, a pin arranged on the slicer adapted to enter said tubular guide to hold the plate in a vertical position, means for supporting the rear end of the plate in a vertical position, and an adjustable plate section adapted to rest upon the upper edge of the forward end of the plate and to be swung backwardly therefrom.

JOHN STANLEY BLAIKIE.